US006904358B2

(12) United States Patent
Nohara et al.

(10) Patent No.: US 6,904,358 B2
(45) Date of Patent: Jun. 7, 2005

(54) SYSTEM FOR DISPLAYING A MAP

(75) Inventors: Manabu Nohara, Tsurugashima (JP); Katsunori Arakawa, Tsurugashima (JP); Yasuteru Kodama, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 514 days.

(21) Appl. No.: 09/987,995

(22) Filed: Nov. 16, 2001

(65) Prior Publication Data

US 2002/0061755 A1 May 23, 2002

(30) Foreign Application Priority Data

Nov. 20, 2000 (JP) ....................................... 2000-352508

(51) Int. Cl.[7] ................................................ G06F 15/16

(52) U.S. Cl. ...................... 701/201; 455/41.2; 455/457; 455/517; 342/357.08; 370/238; 375/219

(58) Field of Search ................................ 701/213, 300, 701/201; 709/200; 455/41.2, 415, 435.1, 41, 456, 517, 457, 500, 11.1, 524, 561, 566, 452, 450, 426; 702/186; 342/357.08, 357, 357.14, 357.13, 357.1; 370/333, 238, 386; 375/219; 340/995.1; 345/501

(56) References Cited

U.S. PATENT DOCUMENTS 5,699,056 A * 12/1997 Yoshida ...................... 340/905
5,924,040 A * 7/1999 Trompower .............. 455/456.2
6,006,096 A * 12/1999 Trompower .............. 455/456.2
6,058,310 A * 5/2000 Tokuyoshi ............... 455/435.3
6,073,075 A * 6/2000 Kondou et al. ............. 701/203
6,108,519 A * 8/2000 Nitta ......................... 340/7.27
6,119,002 A * 9/2000 Alanara ....................... 455/434
6,127,945 A * 10/2000 Mura-Smith ................ 340/988
6,246,376 B1 * 6/2001 Bork et al. ................. 343/760
6,317,604 B1 * 11/2001 Kovach et al. .......... 455/456.5
6,327,533 B1 * 12/2001 Chou ......................... 701/207
6,754,266 B2 * 6/2004 Bahl et al. ............. 375/240.01
2002/0065058 A1 * 5/2002 Gatherer et al. ............ 455/272

FOREIGN PATENT DOCUMENTS

EP 0 788 248 A2 8/1997
EP 1 059 737 A1 12/2000
FR 2 782 225 A1 2/2000
GB 2 298 539 A 9/1996
WO WO 00/39944 A1 7/2000

* cited by examiner

*Primary Examiner*—Thomas G. Black
*Assistant Examiner*—Tuan C To
(74) *Attorney, Agent, or Firm*—Sughrue Mion, PLLC

(57) ABSTRACT

The present invention relates to a system for displaying a map in a display unit of a mobile terminal device such that the relationship between a moving direction of the mobile terminal device and a direction of the displayed map is easily understandable. When the system detects that the mobile terminal device exists in a particular region on a path, it sends map data of the region to the mobile terminal device. The mobile terminal device receives the map data and displays a map of the region such that the moving direction of the portable terminal device is aligned with a top of the map displayed in the display unit.

32 Claims, 15 Drawing Sheets

SYSTEM FOR DISPLAYING A MAP

BACKGROUND OF THE INVENTION

1. Field of the Invention

The present invention relates to a system for displaying a map using a mobile (portable) terminal device.

2. Description of the Related Art

One of the information providing services offered by cellular telephone companies or affiliated companies is transmitting map data to a cellular phone so that a map is displayed in a display screen of the cellular phone. In general, a data server can include map data to provide map data of various areas. When a user of a cellular phone operates the cellular phone to specify a desired area, information about the specified area is transmitted by wireless communication to a data server from the cellular phone. Then, map data that matches the specified area information is transmitted by wireless communication back to the cellular phone from the data server so that a map of the desired area is displayed in the display screen of the cellular phone.

A user of a mobile or portable terminal device such as a cellular phone usually sees a map when the user visits an unfamiliar place. The user often does not know which direction is the north or south. The map is generally displayed in the cellular phone screen with the top of the map being directed to the north. Unless the user knows which direction is the north, the displayed map is difficult to use.

SUMMARY OF THE INVENTION

An object of the present invention is to provide a system for displaying a map in a display screen of a mobile terminal device such that a user of the mobile terminal device can easily understand relationship between a heading (or moving) direction of the user and a direction of the displayed map.

According to a first aspect of the present invention, there is provided a system for displaying a map in a display unit of a mobile terminal device, the system comprising a terminal detector for detecting if the mobile terminal device exists in a first region on a path, a transmitter for transmitting map data representing a map of and around the first region to the mobile terminal device when the terminal detector detects that the mobile terminal device exists in the first region, a receiver for receiving the map data from the transmitter, and a controller for causing the display unit to display the map based on the map data received by the receiver such that a top of the map is aligned with a top of the display unit.

According to a second aspect of the present invention, there is provided a host device for transmitting map data to a mobile terminal device, comprising a terminal detector for detecting if the mobile terminal device exists in a first region on a path, and a transmitter for transmitting map data representing a map of and around the first region to the mobile terminal device when the terminal detector detects that the mobile terminal device exists in the first region.

According to a third another aspect of the present invention, there is provided a method of displaying a map in a display unit of a mobile terminal device, comprising the steps of (A) detecting if the mobile terminal device exists in a first region on a path, (B) transmitting map data representing a map of and around the first region to the mobile terminal device when existence of the mobile terminal device in the first region is detected in Step A, (C) receiving the map data, and (D) causing the display unit to display the map based on the received map data such that a top of the displayed map is aligned with a moving direction of the mobile terminal device.

According to a fourth aspect of the present invention, there is provided a system for displaying a map in a display unit of a mobile terminal device, comprising a first terminal detector for detecting if the mobile terminal device exists in a first region on a path, a second terminal detector for detecting if the mobile terminal device exists in a second region other than the first region on the path, a first transmitter for transmitting first map data representing a first map of and around the first region to the mobile terminal device when the first terminal detector detects that the mobile terminal device exists in the first region, a second transmitter for transmitting second map data representing second map of and around the second region to the mobile terminal device when the second terminal detector detects that the mobile terminal device exists in the second region, a receiver for receiving the first map data from the first transmitter and the second map data from the second transmitter, and a controller for causing the display unit to display the first or second map based on the first or second map data received by the receiver such that a top of the displayed first or second map is aligned with a moving direction of the mobile terminal device.

According to a fifth aspect of the present invention, there is provided a host device for transmitting map data to a mobile terminal device, comprising a first terminal detector for detecting if the mobile terminal device exists in a first region on a path, a second terminal detector for detecting if the mobile terminal device exists in a second region other than the first region on the path, a first transmitter for transmitting first map data representing a first map of and around the first region to the mobile terminal device when the first terminal detector detects that the mobile terminal device exists in the first region, and a second transmitter for transmitting second map data representing second map of and around the second region to the mobile terminal device when the second terminal detector detects that the mobile terminal device exists in the second region.

According to a sixth aspect of the present invention, there is provided a method of displaying a map in a display unit of a mobile terminal device, comprising the steps of (A) detecting if the mobile terminal device exists in a first region on a path, (B) detecting if the mobile terminal device exists in a second region other than the first region on the path, (C) transmitting first map data representing a map of and around the first region to the mobile terminal device when presence of the mobile terminal device in the first region is detected in Step A, (D) transmitting second map data representing a map of and around the second region to the mobile terminal device when presence of the mobile terminal device in the second region is detected in Step B, and (E) receiving at least one of the first and second map data and causing the display unit to display the map based on the received map data such that a top of the displayed map is aligned with a moving direction of the mobile terminal device.

According to a seventh aspect of the present invention, there is provided a mobile terminal device comprising a display unit, a receiver for receiving map data, a controller for causing the display unit to display a map based on the map data received by the receiver, and a direction detector for detecting a direction of the mobile terminal device, wherein the controller converts the received map data on the basis of the direction of the mobile terminal device detected by the direction detector such that the map is displayed in a particular direction regardless of the direction of the mobile terminal device.

According to an eight aspect of the present invention, there is provided a mobile terminal device comprising a display unit, a receiver for receiving map data, and a controller for causing the display unit to display a map based on the map data received by the receiver, wherein when the receiver receives first map data of a first cell within a predetermined period after receiving second map data of a second cell other than the first cell, the controller ignores the first map data and causes the display unit to keep displaying the map based on the second map data.

DETAILED DESCRIPTION OF THE INVENTION

Embodiments of the present invention will be described in reference to the accompanying drawings.

Figure 1:
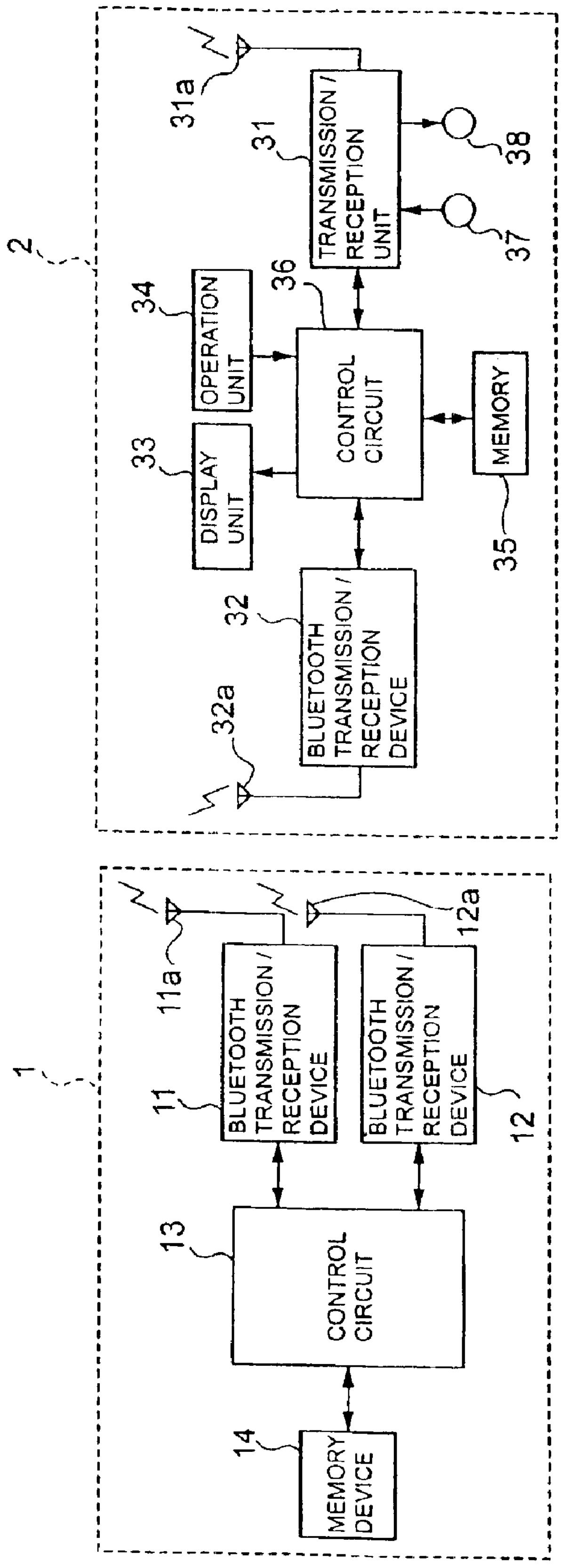
FIG. 1 illustrates a block diagram of a map displaying system according to one embodiment of the present invention.

Referring to FIG. 1, illustrated is a system for displaying a map according to a first embodiment of the present invention. The map displaying system includes a host device 1 and a portable (mobile) terminal device 2. The host device 1 may be located on the ground adjacent to an entrance/exit of a subway. The host device 1 provides wireless (radio) communication with the portable terminal device 2. A technique in compliance with the Bluetooth standard is employed as the wireless (radio) communication technique.

As shown in FIG. 1, the host device 1 includes two Bluetooth transmission/reception units 11 and 12, a control circuit 13 and a memory device 14. Each of the Bluetooth transmission/reception units 11 and 12 is a unit for transmitting and receiving signals in compliance with the Bluetooth standard and has an antenna 11*a*, 12*a*. The antennas 11*a* and 12*a* possess different directivities. An area (region) of signal transmission and reception by the antenna 11*a* is a semicircular, first cell, and an area of signal transmission and reception by the antenna 12*a* is a semicircular, second cell. The first and second cell are independent from each other. The memory device 14 stores map data in the form of image data. The map data includes two kinds of maps. One map is a ground map that shows a plat on the ground, with a direction towards a ground entrance/exit from a underground passage(way) of a subway system being at the top of the map. The other map is an underground map that shows a plat under the ground, with the direction towards the underground from the ground entrance/exit being at the top of the map. The maps indicate streets, banks, hotels, department stores, shops, and other conspicuous buildings with their names. The control circuit 13 reads the map data from the memory device 14 when the first Bluetooth transmission/reception device 11 receives a signal from a remote Bluetooth machine such as the portable terminal device 2. The control circuit 13 then causes the first Bluetooth transmission/reception device 11 to transmit the map data to the Bluetooth machine.

The portable terminal device 2 is a mobile terminal machine that has a cellular phone function. As schematically illustrated in FIG. 1, the portable terminal device 2 includes a telephone signal transmission/reception part 31, a Bluetooth transmission/reception part 32, a display unit 33, an operation unit 34, a memory 35, and a control circuit (CPU) 36. The telephone transmission/reception unit 31 for wireless telephone communication has an antenna 31*a*, a microphone 37 and a speaker 38. The microphone 37 and speaker 38 are provided for telephone conversation. The Bluetooth transmission/reception device 32 is a signal transmission and reception unit that conforms to the Bluetooth standard. An antenna 32*a* extends from the Bluetooth transmission/reception device 32. The control circuit 36 is connected to the telephone transmission/reception unit 31, Bluetooth transmission/reception device 32, display 33, control panel 34 and memory 35, and controls the overall operations of the portable terminal device 2.

Figure 2:
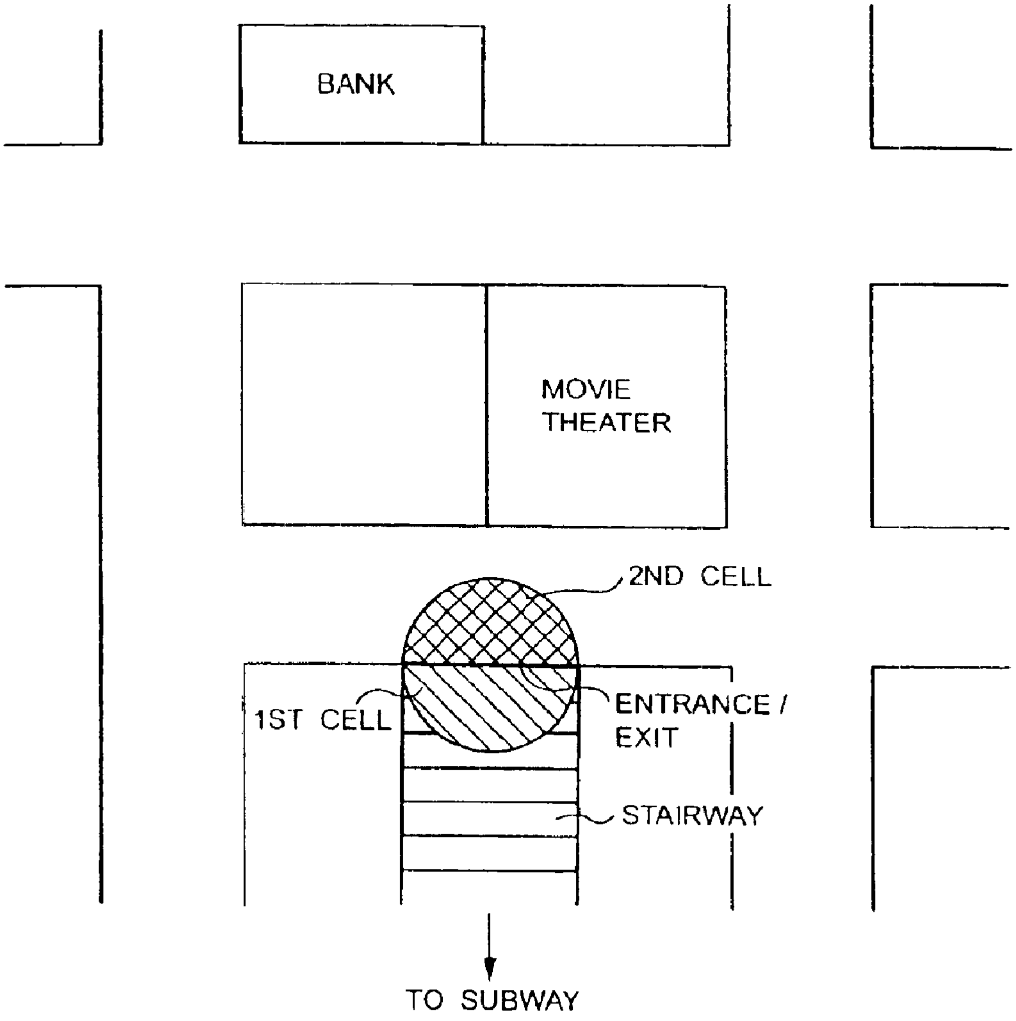
FIG. 2 illustrates a map around a ground entrance/exit of a subway together with two cells used by the system shown in FIG. 1.
Figure 3:
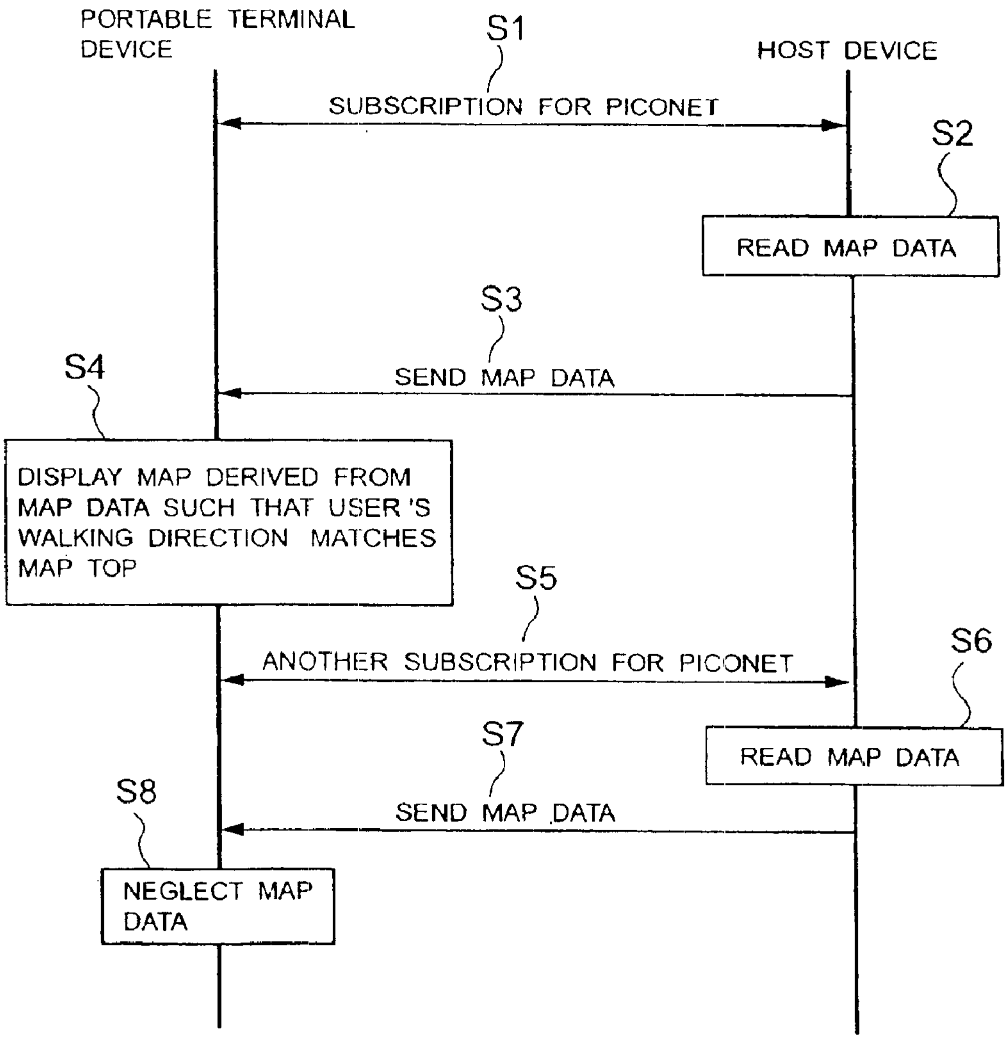
FIG. 3 illustrates a sequence diagram for displaying a map executed by the system shown in FIG. 1.

When a user of the portable terminal device 2 walks upstairs from an underground passage(way) of a subway and enters the area of the first cell as shown in FIG. 2, the portable terminal device 2 subscribes for a piconet as shown in FIG. 3 (Step S1). The host device 1 is a master and the portable terminal device 2 is a slave in the piconet. A subscription procedure for the piconet is defined in the Bluetooth standard so that the subscribing procedure will not be described here. The first Bluetooth transmission/reception device 11 in the host device 1 is activated to communicate with the Bluetooth transmission/reception device 32 in the portable terminal device 2 for the piconet subscription.

After the subscription procedure for the piconet is complete, the control circuit 13 of the host device 1 reads map data, which shows a ground map suited for the user present in the first cell, from the memory device 14 (Step S2), and causes the Bluetooth transmission/reception device 11 to send the map data to the portable terminal device 2 (Step S3).

Figure 4:
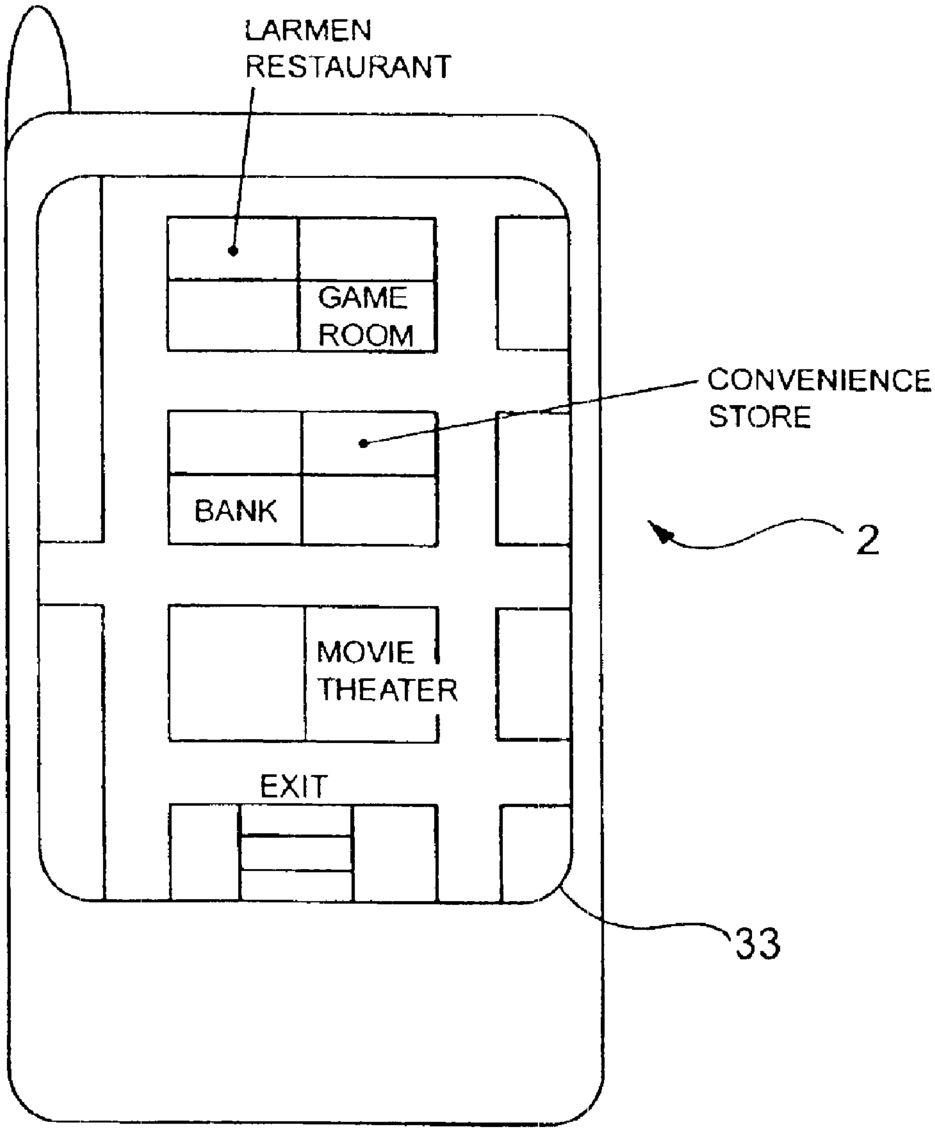
FIG. 4 illustrates a map displayed in a portable terminal device of the system shown in FIG. 1.

Upon receiving the map data, the Bluetooth transmission/reception device 32 of the portable terminal device 2 transfers the map data to the control circuit 36. The control circuit 36 transfers the map data to the display unit 33 and causes the display unit 33 to display the map such that the top of the map is shown at the top of the display unit 33 (Step S4). The display 33 of the portable terminal device 2 shows the map as depicted in FIG. 4. The top of the displayed map corresponds to the direction towards the ground exit from the underground facility.

It should be noted that the map displaying operation may not be done automatically, but by a certain operation made onto the control panel 34 by the user.

On the other hand, when the user of the portable terminal device 2 on the ground walks into the second cell area (FIG. 2) in order to step down into the underground facility, the portable terminal device 2 subscribes for the piconet (Step S1), as in the case of stepping up to the ground from the underground facility. The second Bluetooth transmission/reception device 12 of the host device 1 is then activated to communicate with the Bluetooth transmission/reception device 32 of the portable terminal device 2 for the piconet subscription.

After completing the subscribing procedure for the piconet, the control circuit 13 of the host device 1 reads map data, which shows an underground map suited for the user present in the second cell, from the memory device 14 (Step S2). The control circuit 13 then causes the Bluetooth transmission/reception device 12 to send the map data to the portable terminal device 2 (Step S3).

When the Bluetooth transmission/reception device 32 of the portable terminal device 2 receives the map data, the Bluetooth transmission/reception device 32 supplies the map data to the control circuit 36. The control circuit 36 supplies the map data to the display unit 33 and causes the display unit 33 to show the subway facility map (underground map) such that the top of the map is shown at the top of the display screen (Step S4). The top of the displayed map corresponds to the direction from the ground entrance to the underground facility. The top of the display screen 33 is generally directed in a direction in which the user of the portable terminal device 2 is walking (downward arrow in FIG. 2). The user is walking downstairs in this instance.

If the portable terminal device 2 immediately moves from the area of the first cell to the area of the second cell, the map data of ground map is transmitted to the portable terminal device 2 and subsequently a new piconet is established between the Bluetooth transmission/reception devices 12 and 32 (Step S5) so that another map data of underground map is read and transmitted (Steps S6 and S7). The map data of underground map is, however, neglected by the portable terminal device 2 (Step S8). Contrarily, when the portable terminal device 2 immediately moves into the area of the first cell from the area of the second cell, the map data of the underground map is transmitted to the portable terminal device 2 and subsequently a new piconet is established between the Bluetooth transmission/reception devices 11 and 32 so that the map data of ground map is also transmitted to the portable terminal device 2. The map data of the ground map is, however, ignored by the portable terminal device 2. The host device 1 handles both the first and second cells in the above described embodiment so that the host device 1 may be designed such that the host device 1 only sends the map data of the ground map when the host device 1 detects a fact that the portable terminal device 2 has moved to the second cell area from the first cell area within a predetermined period. Likewise, it is possible to design the host device 1 such that the host device 1 only sends the map data of underground map when the host device detects that the portable terminal device 2 has moved to the first cell area from the second cell area within a predetermined period.

Although the map data is only transmitted to the portable terminal device 2 in the above described embodiment, it is satisfactory to broadcast the same map data to other portable (mobile) terminal devices existing in the same cell as the portable terminal device 2.

Figure 5:
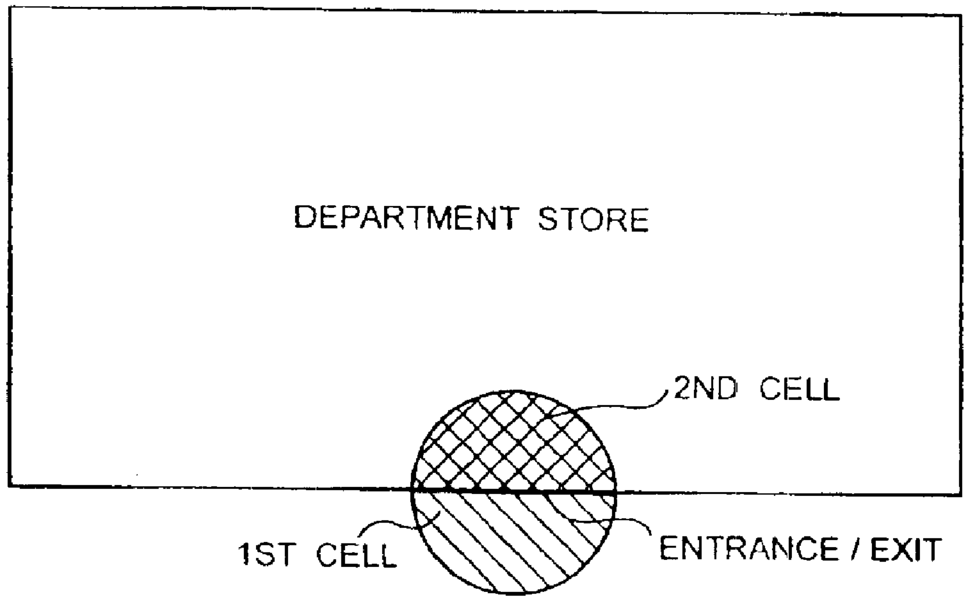
FIG. 5 illustrates two cells defined at an entrance/exit of a department store when the system shown in FIG. 1 is designed for a portable terminal device user who enters and exits the department store.

The above described system for displaying a map is applicable when the user enters or exits a department store. Referring to FIG. 5, the semicircular first cell outside the entrance/exit of the department store is used as the signal transmission/reception area of the antenna 11*a* and the opposite semicircular cell (second cell) inside the entrance/exit of the department store is used as the signal transmission/reception area of the antenna 12*a*. The map data stored in the memory device 14 include a map of a first floor inside the department store and a map of streets outside the department store. The top of the map of the first floor is aligned with the perpendicular direction from the outside of the department store to the inside through the entrance/exit (direction in which the user of the portable terminal device 2 perpendicularly walks into the department store through the entrance/exit). The top of the map of the streets is aligned with the perpendicular direction from the inside of the department store to the outside. When the user of the portable terminal device 2 outside the department store walks towards the entrance/exit of the department store and steps in the first cell, the procedure shown in FIG. 3 is carried out so that the map of the sales floor (first floor) inside the department store is shown in the display screen 33 of the portable terminal device 2. The control circuit 36 causes the display to display the map such that the top of the map coincides with the top of the display screen. When the user of the portable terminal device 2 inside the department store walks towards the entrance/exit of the department store and steps in the second cell, on the other hand, the procedure shown in FIG. 3 takes place so that the map of the streets outside the department store is shown in the display screen 33 of the portable terminal device 2. The control circuit causes the display 33 to display the map such that the top of the map coincides with the top of the screen.

Figure 6:
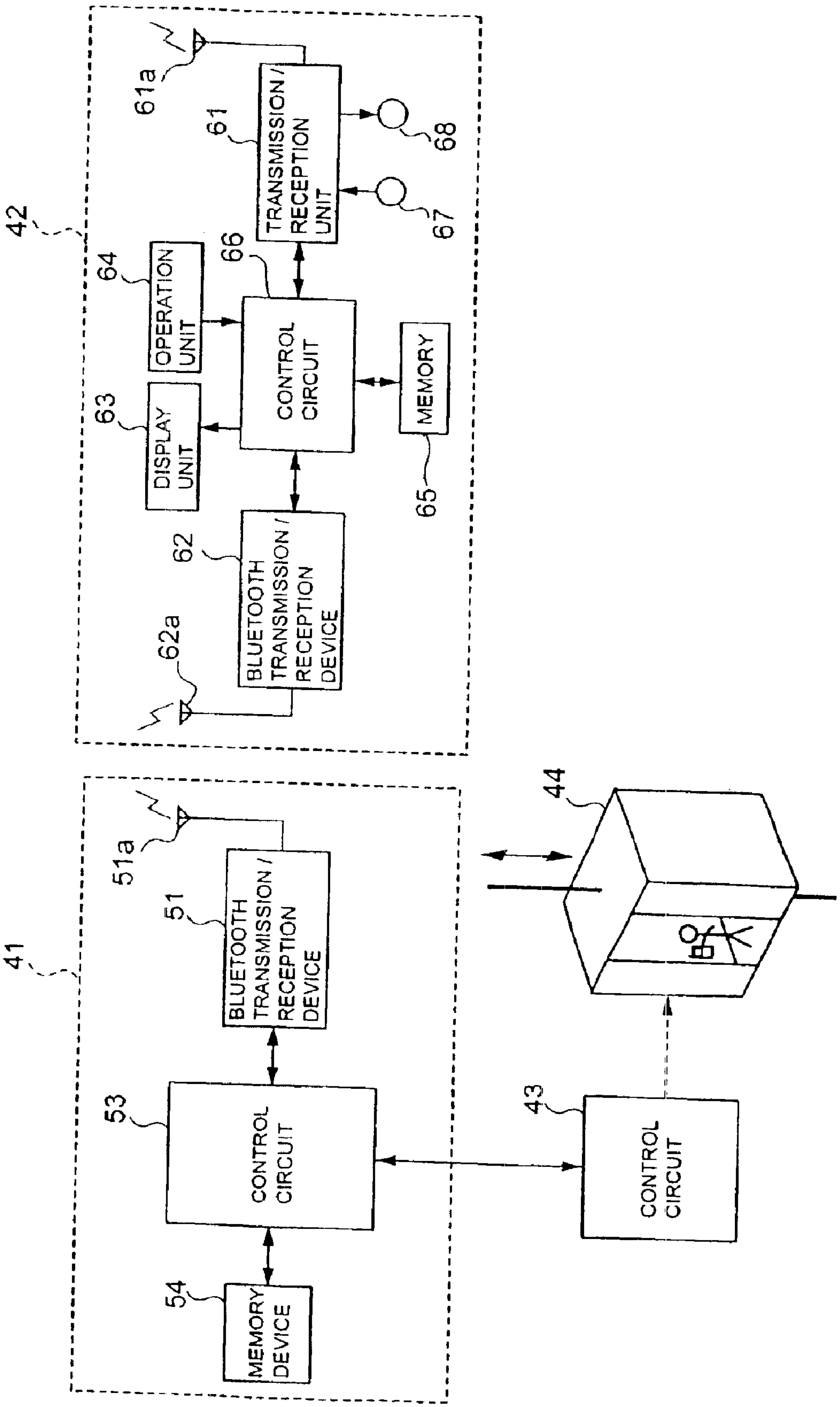
FIG. 6 illustrates a block diagram of a map displaying system according to another embodiment of the present invention.

Referring to FIG. 6, illustrated is a system for displaying a map that is activated in accordance with different floors of the department store. In general, the department store has more than one floor and a customer goes to different floors by an elevator. The illustrated system can show maps of different floors, and includes a host device 41, a portable terminal device 42 and a control circuit 43 of an elevator 44. The elevator control circuit 43 causes the elevator 44 to move up and down in accordance with an operation made by a person in the elevator so as to stop the elevator 44 at a desired floor.

The host device 41 is similar to the host device 1 shown in FIG. 1 except for having only one Bluetooth transmission/reception device. The host device 41 includes a Bluetooth transmission/reception device 51, a control circuit 53 and a memory device 54. An antenna 51*a* of the Bluetooth transmission/reception device 51 is provided in the elevator cage 44, but other elements of the host device 41 may be provided either inside or outside the elevator cage 44. The host device control circuit 53 is coupled with the elevator control circuit 43 via an interface (not shown). The elevator control circuit 43 supplies data of floor, on which the user of the portable terminal device 42 desires to get off, to the host device control circuit 53. The memory device 54 stores map data of respective floors in the department store. The top of the each floor map is aligned with the perpendicular direction from the inside of the elevator to the floor.

The portable terminal device 42 has a structure similar to the portable terminal device 2 shown in FIG. 1. Specifically, the portable terminal device 42 includes a telephone signal transmission/reception unit 61, a Bluetooth transmission/reception unit 62, a display unit 63, an operation unit 64, a memory 65, a control circuit 66, a telephone microphone 67 and a telephone speaker 68. Like the system shown in FIG. 1, wireless communication takes place between the host device 41 and portable terminal device 42 using the Bluetooth technique. The interior of the elevator cage 44 is an area of signal transmission and reception (i.e., cell) covered by the antenna 51*a*.

Figure 7:
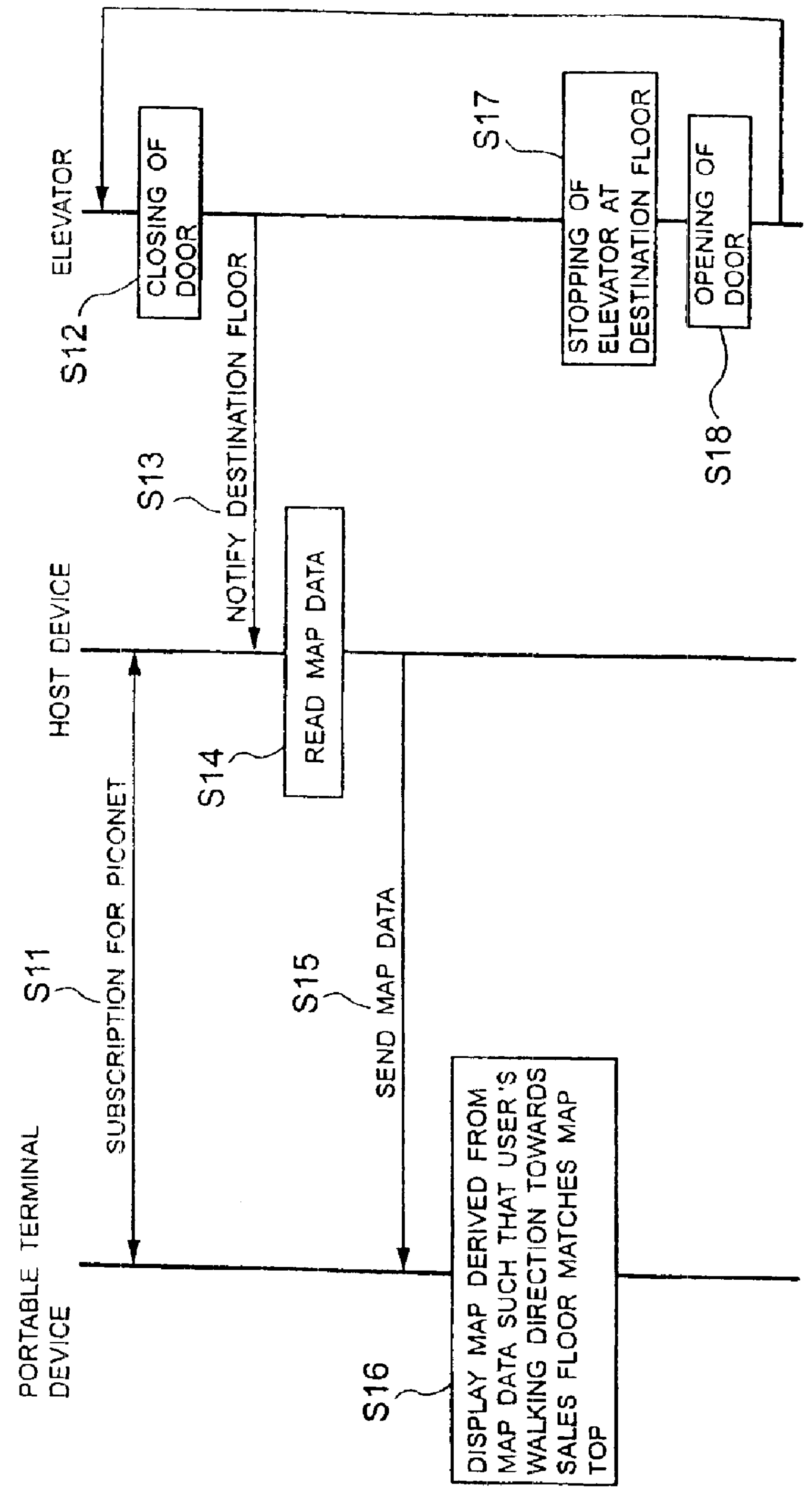
FIG. 7 illustrates a sequence diagram for displaying a map executed by the system shown in FIG. 6.

Referring to FIG. 7, a subscribing operation of the portable terminal device 42 for the piconet is executed when the user of the portable terminal device 42 steps into the elevator cage 44 (Step S11). In the piconet, the host device 41 is a master and the portable terminal device 42 is a slave. The Bluetooth transmission/reception device 51 of the host device 41 is activated to communicate with the Bluetooth transmission/reception device 62 of the portable terminal device 42 for the piconet subscription.

When a door of the elevator closes (Step S12), the control circuit 43 supplies data of desired floor to the control circuit 53 of the host device 41 (Step S13). Upon receiving the data of desired floor, the control circuit 53 retrieves map data of the desired floor from the memory device 54 (Step S14). The control circuit 53 then causes the Bluetooth transmission/reception device 51 to transmit the map data to the portable terminal device 42 (Step S15).

Upon receiving the map data, the Bluetooth transmission/reception device 62 of the portable terminal device 42 supplies the map data to the control circuit 66. Subsequently the control circuit 66 feeds the map data to the display unit 63 and causes the display unit 63 to display a map of the floor at which the elevator will stop (Step S16). The control circuit 66 causes the display unit 63 to display the map such that the top of the map coincides with the direction penetrating the elevator cage door at right angle from the inside of the elevator cage 44 towards the floor.

Eventually the elevator 44 arrives at the desired floor and stops (Step S17). After the door opens (Step S18), the program returns to Step S12 because the door closes. The procedure from Steps S13 to S16 is then repeated to cause the display unit 63 to display a map of a next desired floor.

Figure 8:
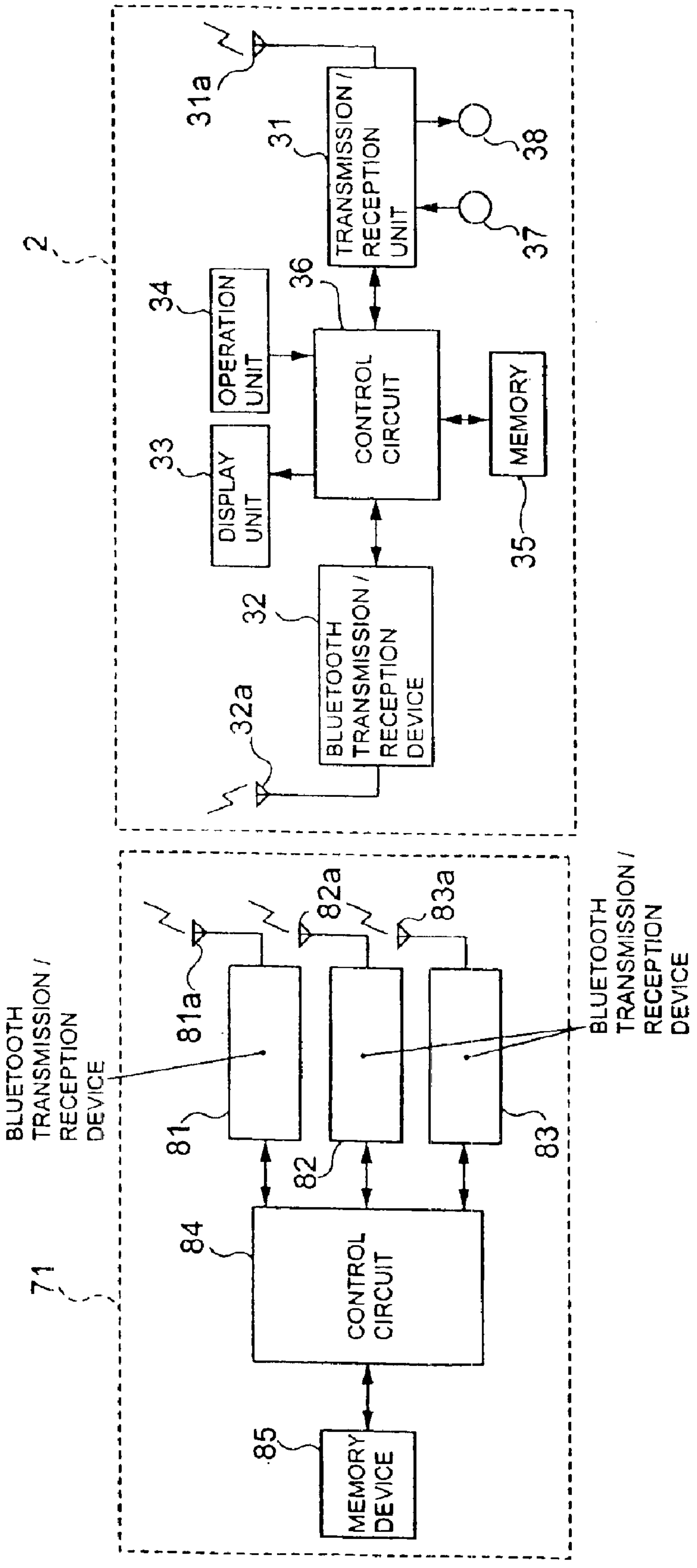
FIG. 8 illustrates a block diagram of a map displaying system according to still another embodiment of the present invention.
Figure 9:
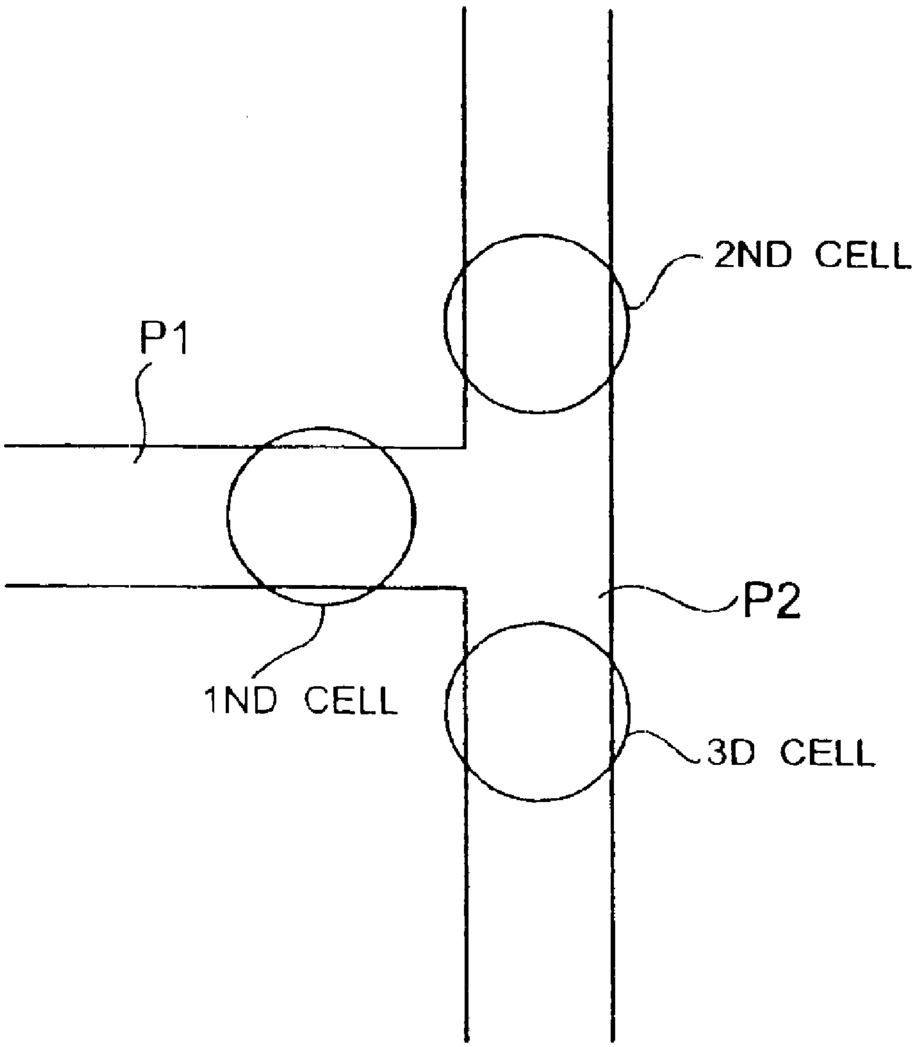
FIG. 9 illustrates a map of T-shaped intersection together with three cells used by the system shown in FIG. 8.

Referring to FIG. 8, illustrated is a system for displaying a map when a user of the portable terminal device 2 walks in a T-shaped intersection under the ground of a subway facility. A path P1 meets another path P2 perpendicularly thereby forming the T-shaped intersection. A host device 71 of the map displaying system includes three Bluetooth transmission/reception devices 81 to 83, a control circuit 84 and a memory device 85. The first Bluetooth transmission/reception device 81 can communicate with a portable terminal device in the first cell (FIG. 9), i.e., a circular area of signal transmission and reception covered by an antenna 81*a* provided on the path P1. The second Bluetooth transmission/reception device 82 can communicate with a portable terminal device in the second cell, i.e., a circular area of signal transmission and reception covered by an antenna 82*a* provided on the path P2. The third Bluetooth transmission/reception device 83 can communicate with a portable terminal device in the third cell, i.e., a circular area of signal transmission and reception covered by an antenna 83*a* provided on the path P2 opposite the second cell relative to the path P1. The first to third cells are established in the vicinity of the intersection of the paths P1 and P2. When viewed from the path P1, the second cell is present on the left side of the intersection and the third cell is present on the right side.

The memory device 85 stores three map data in the form of image data. The first map data shows an underground map such that the top of the map coincides with the direction from the first cell to the intersection, the second map data shows an underground map such that the top of the map coincides with the direction from the second cell to the intersection, and the third map data shows an underground map such that the top of the map coincides with the direction from the third cell to the intersection.

The portable terminal device 2 shown in FIG. 1 is used in the system shown in FIG. 8.

Operation of the portable terminal device 2 for displaying a map when the user of the portable terminal device 2 walks in the intersection along the path P1 or P2 will be described.

Figure 10:
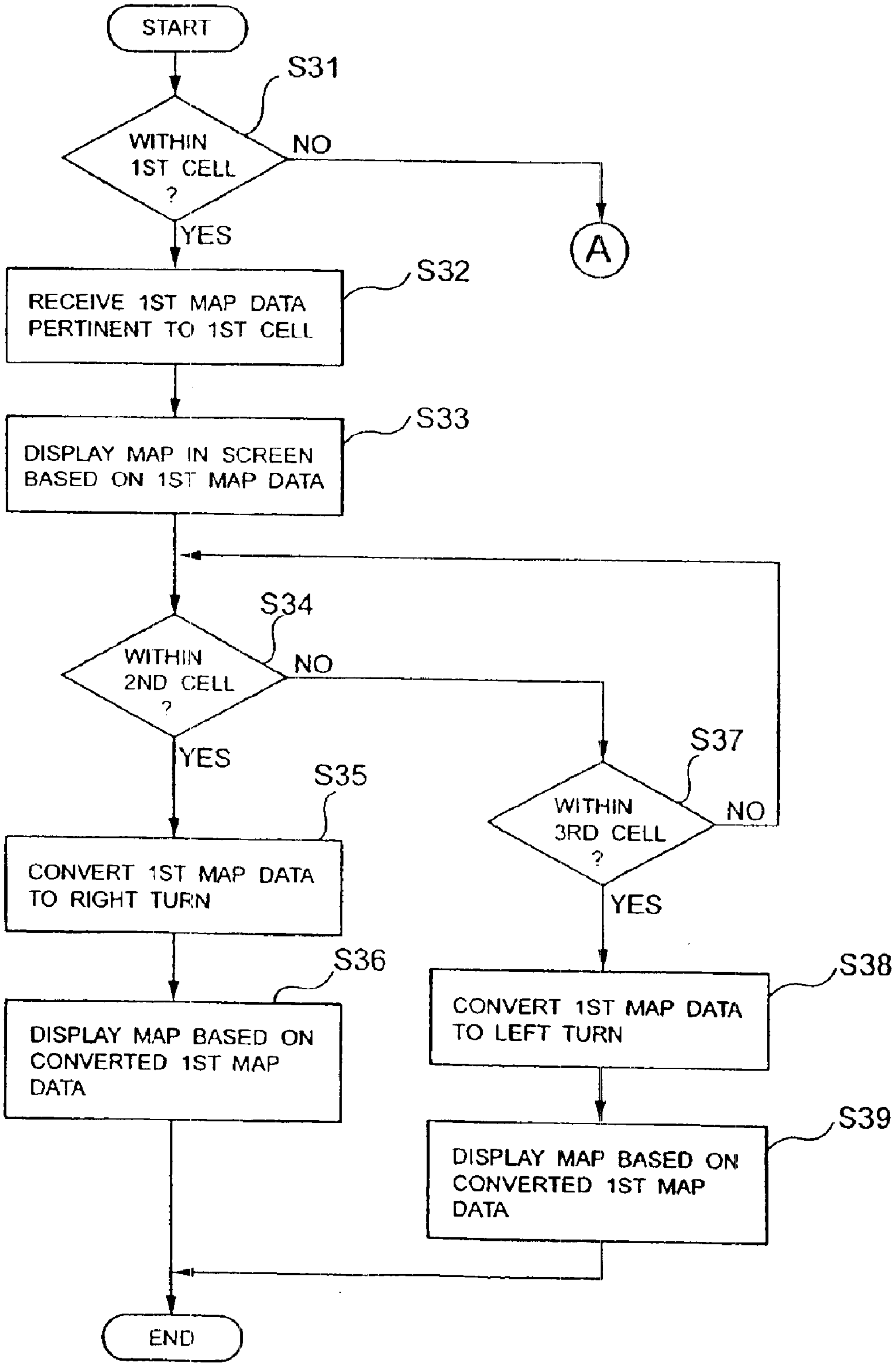
FIGS. 10 and 11 illustrate a flowchart of operation executed by the system shown in FIG. 8 to show a map in a portable terminal device.

Referring to FIG. 10, the control circuit 36 of the portable terminal device 2 determines whether the portable terminal device 2 exists in the first cell (Step S31). If the portable terminal device 2 exists in the first cell, the control circuit 36 can obtain information of existence of the portable terminal device 2 in the first cell from the host device 71 because the portable terminal device 2 performs the subscribing operation for the piconet. Likewise, if the portable terminal device 2 exists in the second (or third) cell, the control circuit 36 can obtain information of existence of the portable terminal device 2 in the second (or third) cell from the host device 71.

When the portable terminal device 2 is present in the first cell, the portable terminal device 2 receives first map data from the host device 71 (Step S32). The first map data is map data suited for the user in the first cell. An underground map derived from the first map data is then displayed in the display screen 33 of the portable terminal device 2 (Step S33). The control circuit 36 causes the display to show the map such that the top of the map coincides with the top of the display screen. The top of the map is aligned with the direction from the first cell to the intersection.

After Step S33, the control circuit 36 determines whether the portable terminal device 2 is present in the second cell (Step S34). In other words, Step S34 determines whether the user of the portable terminal device 2 who has stepped out the first cell now walks into the second cell by making the left turn at the intersection. If the portable terminal device 2 (or the user) exists in the second cell, the first map data received at Step S32 is converted to map data suited for the user in the second cell (Step S35). Specifically, the first map data is converted such that the map in the screen 33 of the portable terminal device 2 is turned 90 degrees to the right. The map prepared from the converted map data is then displayed in the screen 33 (Step S36). The top of the map in the screen 33 coincides with the direction from the intersection to the second cell because the control circuit 36 causes the display to show the 90-degree turned map such that the new top of the map is aligned with the top of the display screen.

When the control circuit 36 determines at Step S34 that the portable terminal device 2 does not exist in the second cell, the control circuit 36 then determines whether the portable terminal device 2 exists in the third cell (Step S37). In other words, it is determined whether the user of the portable terminal device 2 walks from the first cell to the third cell by making the right turn at the intersection. If the portable terminal device 2 is present in the third cell, the first map data received at Step S32 is converted (Step S38). Specifically, the map data is converted such that the map is turned 90 degrees to the left in the screen 33 of the portable terminal device 2. The map prepared from the converted map data is then displayed in the screen 33 (Step S39). The top of the map coincides with the direction from the intersection to the third cell.

If the control circuit 36 determines at Step S37 that no portable terminal device 2 exists in the third cell, the program returns to Step S34 to determine whether the portable terminal device 2 exists in the second cell.

Figure 11:
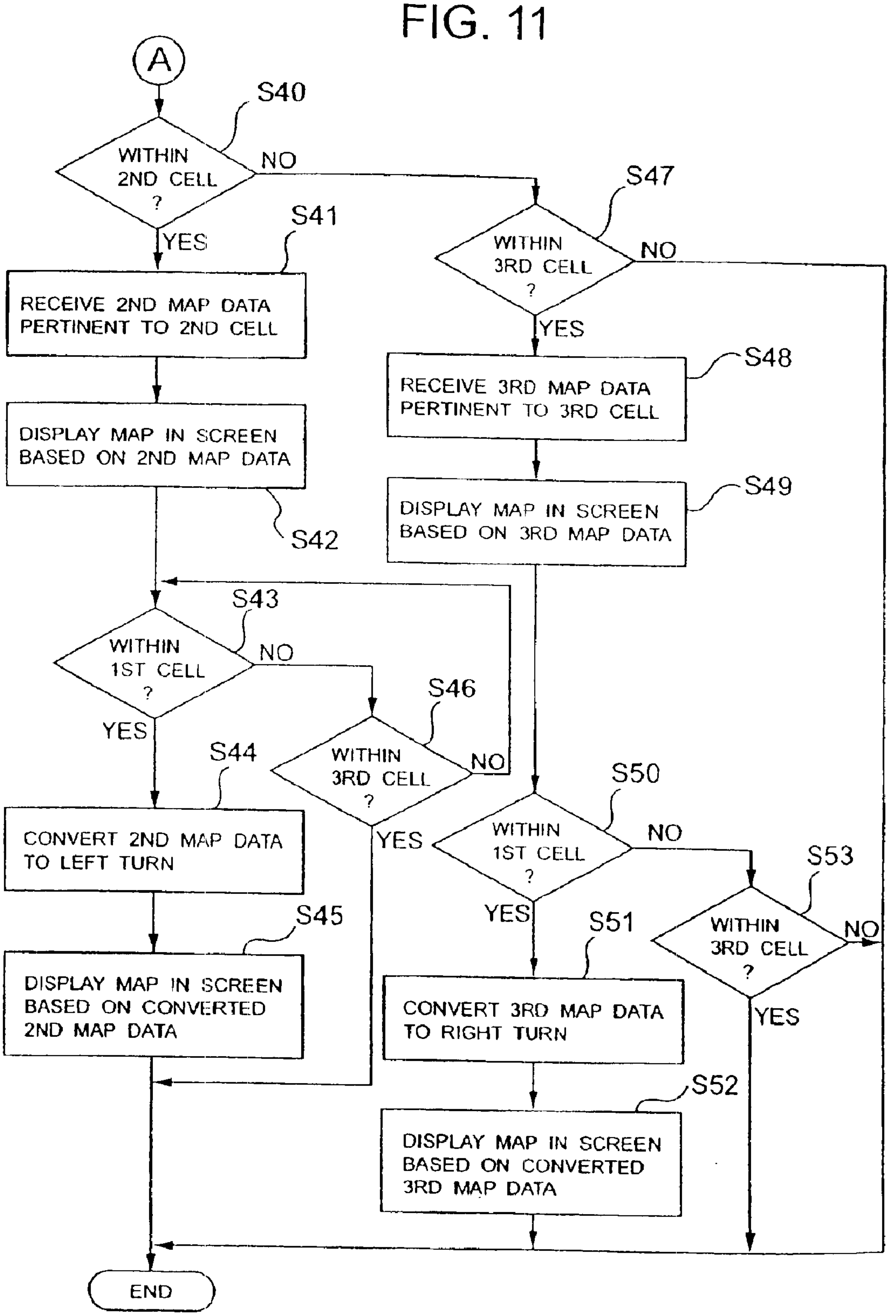

When it is determined at Step S31 that the portable terminal device 2 does not exist in the first cell, the control circuit 36 determines whether the portable terminal device 2 exists in the second cell (Step S40, FIG. 11). If the portable terminal device 2 is present in the second cell, the portable terminal device 2 receives second map data from the host device 71 (Step S41). The second map data is map data suited for the user of the portable terminal device in the second cell. A map prepared from the second map data is then displayed in the screen 33 of the portable terminal device 2 (Step S42). The top of the displayed map is aligned with the direction from the second cell to the intersection.

After Step S42, the control circuit 36 determines whether the portable terminal device 2 exists in the first cell (Step S43). In other words, it is determined whether the user of the portable terminal device 2 walks in the first cell from the second cell by making the right turn at the intersection. If the portable terminal device (or the user) exists in the first cell, the second map data received at Step S41 is converted (Step S44). Specifically, the second map data is converted such that the map in the screen 33 of the portable terminal device 2 is turned 90 degrees. The map prepared from the converted second map data is then displayed in the screen 33 (Step S45). The top of the map coincides with the direction from the intersection to the first cell (or the path P1).

If the control circuit 36 determines at Step S43 that the portable terminal device 2 does not exist in the first cell, the control circuit determines whether the portable terminal device 2 exists in the third cell (Step S46). In other words, it is determined whether the user of the portable terminal device 2 walks straight into the third cell from the second cell. When the portable terminal device 2 is present in the third cell, the direction (posture) of the currently displayed map is maintained.

When the control circuit 36 determines at Step S46 that the portable terminal device 2 does not exist in the third cell, the program returns to Step S43 to determine again whether the portable terminal device 2 exists in the first cell.

When the control circuit 36 determines at Step S40 that the portable terminal device 2 does not exist in the second cell, the control circuit determines whether the portable terminal device 2 exists in the third cell (Step S47). If the portable terminal device 2 exists in the third cell, the portable terminal device 2 receives third map data from the host device 71 (Step S48). The third map data is map data suited for the user in the third cell. A map prepared from the third map data is then shown in the display 33 of the portable terminal device 2 (Step S49). The top of the map coincides with the direction from the third cell to the intersection.

After Step S49, the control circuit 36 determines whether the portable terminal device 2 exists in the first cell (Step S50). In other words, it is determined whether the user of the portable terminal device 2 walks in the first cell from the third cell by making the left turn at the intersection. If the portable terminal device (or the user) is in the first cell, the control circuit converts the third map data received at Step S48 (Step S51). Specifically, the third map data is converted such that the map is turned 90 degrees to the right. A map prepared from the converted third map data is then displayed in the screen 33 of the portable terminal device 2 (Step S52). The top of the map coincides with the direction from the intersection to the first cell (or the path P1).

If the control circuit 36 determines at Step S50 that the portable terminal device 2 does not exist in the first cell, the control circuit determines whether the portable terminal device 2 exists in the second cell (Step S53). In other words, it is determined whether the user of the portable terminal device 2 walks straight into the second cell from the third cell. When the portable terminal device 2 is present in the second cell, the direction (posture) of the currently displayed map is maintained.

If the control circuit 36 determines at Step S53 that the portable terminal device 2 does not exist in the second cell, the program returns to Step S50 and the control circuit 36 determines whether the portable terminal device 2 exists in the first cell.

Therefore, when the user of the portable terminal device 2 moves from a certain location to another location through the intersection, the portable terminal device 2 can show a map in the screen 33 such that the top of the displayed map always corresponds to the moving direction of the user.

Although the above described embodiment deals with the case where the user of the portable terminal device 2 passes through a T intersection, the present invention is also applicable to a case where the user passes through an L-shaped or X-shaped intersection. If the host device can inform the portable terminal device of a turning angle at the intersection (how much the path bends), the map may be turned by a degree corresponding to the informed turning angle. It is not always necessary to turn the map 90 degrees.

Figure 12:
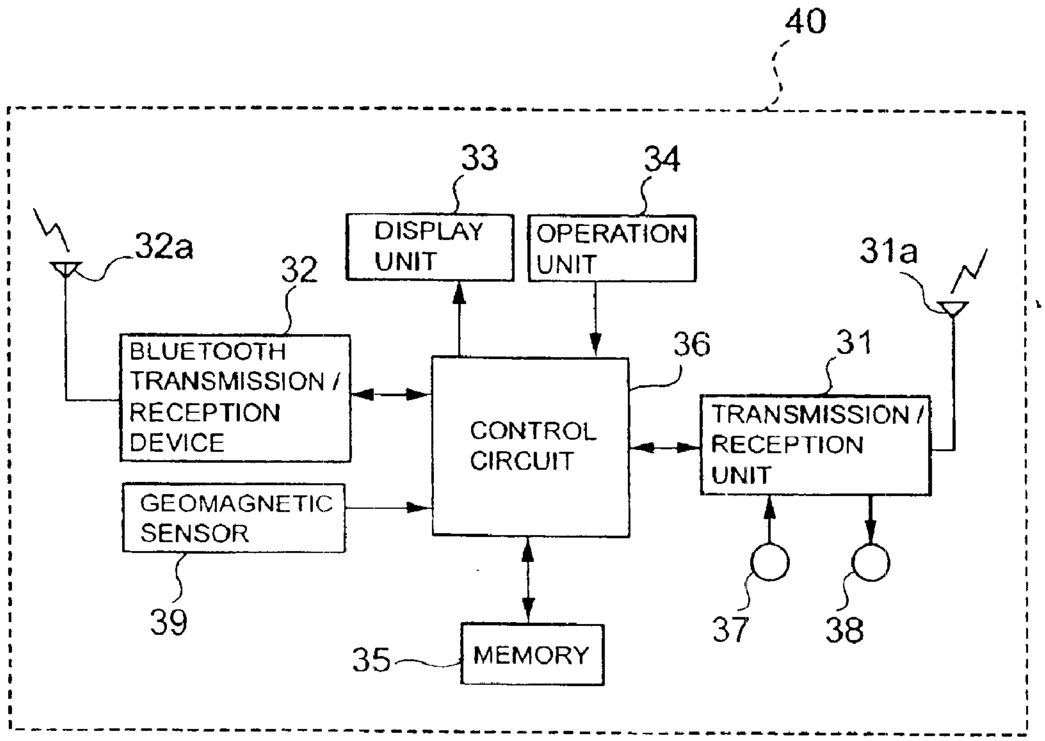
FIG. 12 illustrates a block diagram of a portable terminal device used in a system for displaying a map according to yet another embodiment of the present invention.
Figure 13:
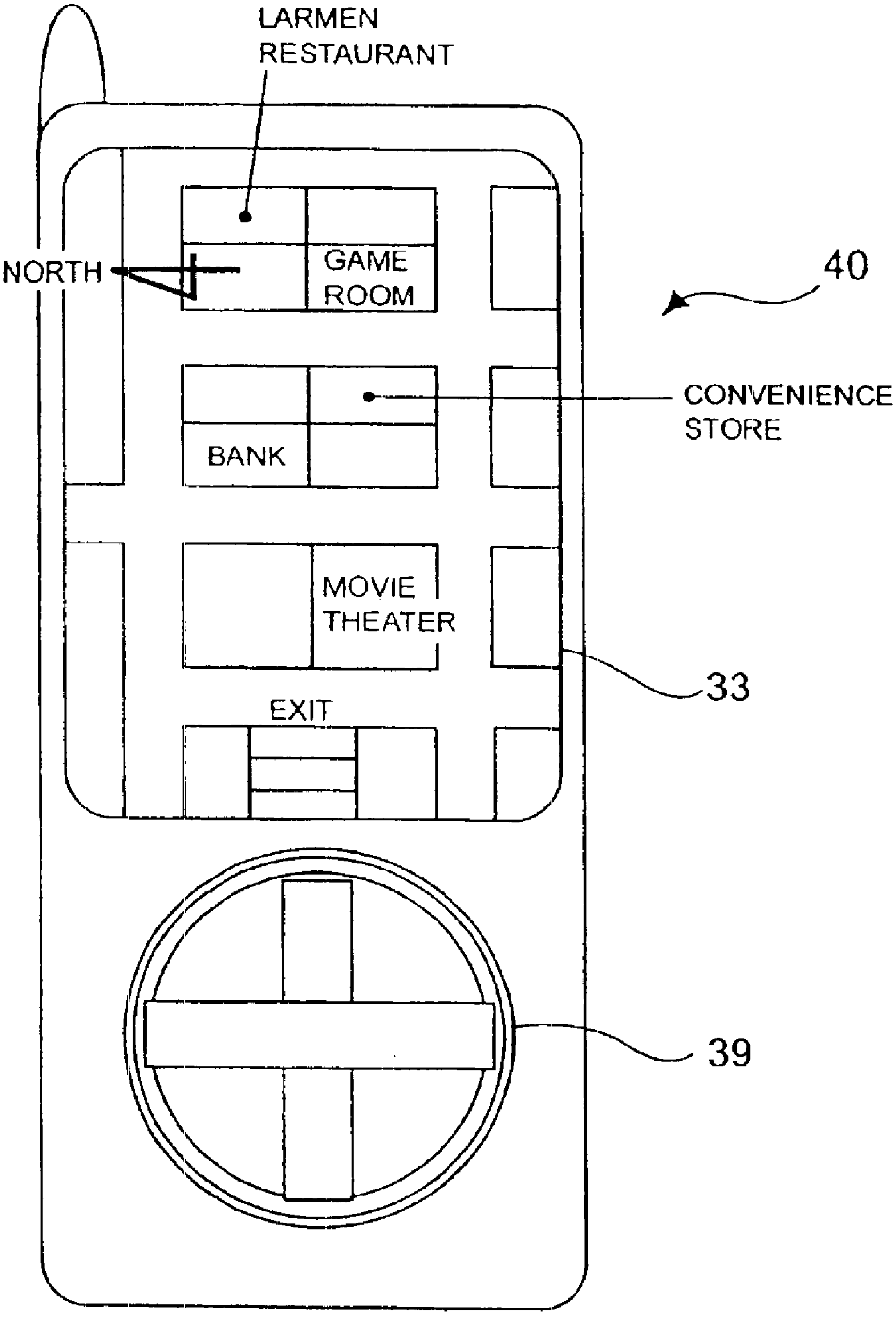
FIG. 13 illustrates an appearance of the portable terminal device shown in FIG. 12.

Referring to FIG. 12, illustrated is a portable terminal device 40 having a geomagnetic sensor 39. The portable terminal device 40 is similar to the portable terminal device 2 shown in FIG. 1 except for having the geomagnetic sensor 39. The portable terminal device 40 includes a telephone signal transmission/reception unit 31, a Bluetooth transmission/reception device 32, a display unit 33, an operation unit 34, a memory 35, a control circuit (CPU) 36, a microphone 37, a speaker 38 and the geomagnetic sensor 39. As illustrated in FIG. 13, the geomagnetic sensor 39 is located below the display 33 on the front face of the portable terminal device 40. A reference direction of the geomagnetic sensor 39 is the north, and the geomagnetic sensor 39 detects the direction of the portable terminal device 40, i.e., in which direction the head of the portable terminal device 40 is pointing.

When the user of the portable terminal device 40 walks upstairs from the underground (subway walkway) towards the ground and enters the first cell (FIG. 2), the portable terminal device performs the subscribing operation for the piconet (Step S1) as shown in FIG. 3. The Bluetooth transmission/reception device 11 of the host 1 is then activated to communicate with the Bluetooth transmission/reception device 32 of the portable terminal device 40 for the piconet subscription. Upon completing the piconet subscribing operation, the control circuit 13 of the host device 1 reads map data suitable for the user in the first cell from the memory device 14 (Step S2) and causes the Bluetooth transmission/reception device 11 to transmit the map data to the portable terminal device 40 (Step S3).

Figure 14:
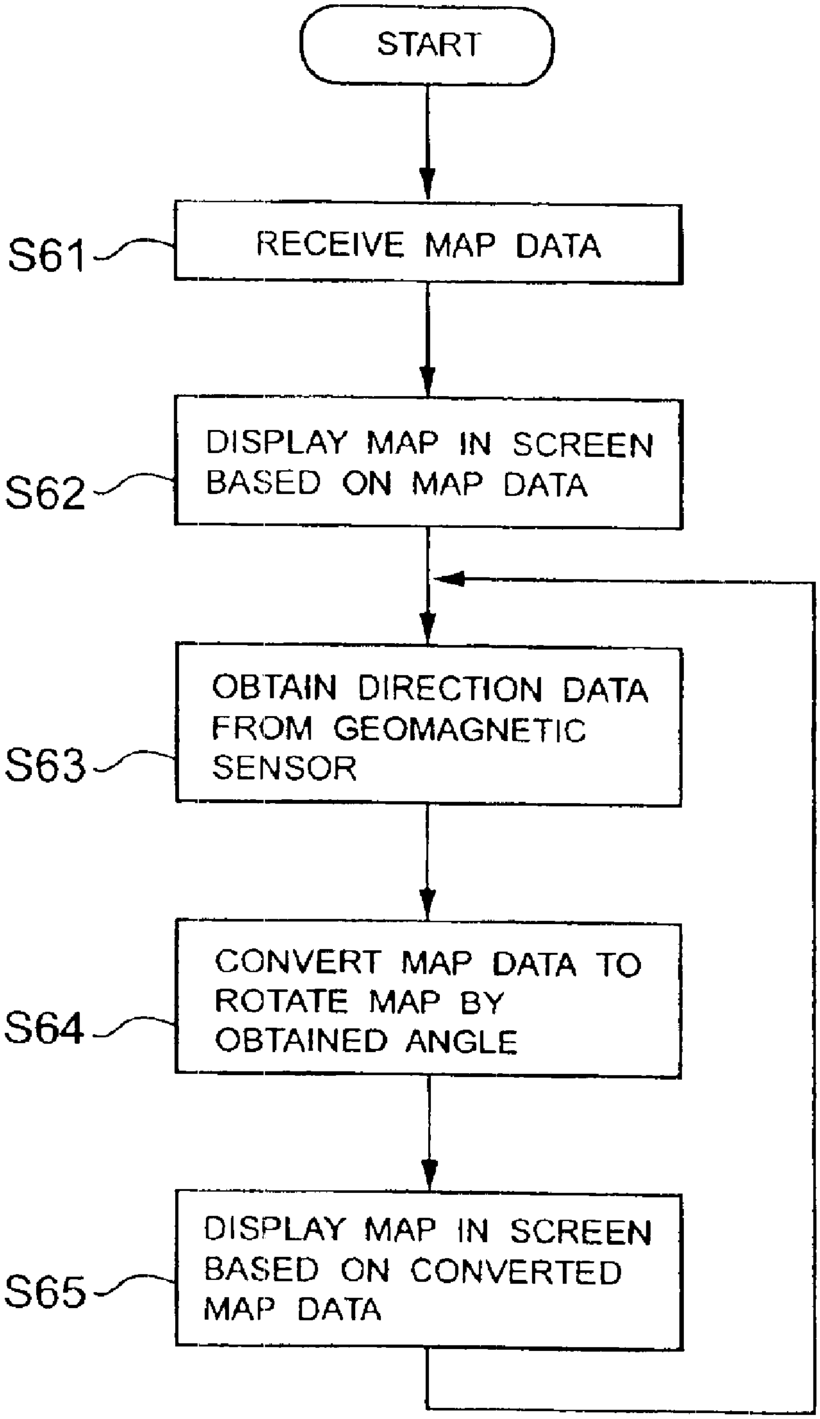
FIG. 14 illustrates a block diagram of operation executed by the map displaying system to display a map in the portable terminal device shown in FIG. 12.

Upon receiving the map data (Step S61 in FIG. 14), the Bluetooth transmission/reception device 32 of the portable terminal device 40 supplies the map data to the control circuit 36. The control circuit 36 supplies the map data to the display unit 33 and causes the display unit to show a map in the display screen such that the top of the map is aligned with the top of the display screen as shown in FIG. 13 (Step S62). The top of the map displayed in the portable terminal device 40 therefore corresponds the direction from the underground walkway to the entrance/exit of the walkway on the ground.

The control circuit 36 then obtains direction data of the portable terminal device 40 (in which direction the portable terminal device 40 is directed, or how much the direction of the portable terminal device 40 is deviated from the reference direction, i.e., the north) from the geomagnetic sensor 39 (Step S63) and converts (rotates) the map data in accordance with the obtained direction data (Step S64). The control circuit 36 feeds the converted map data to the display unit 33 and causes the display unit 33 to display the map on the basis of the converted map data (Step S65). Therefore, the direction of the map top in the display screen 33 is adjusted to always align with the direction from the underground walkway to the ground entrance/exit of the walkway, even if the longitudinal direction of the portable terminal device 40 is deviated from the direction from the underground walkway to the ground entrance/exit of the walkway. The deviation from the portable terminal device 40 from the north is adjusted (counterbalanced) by the geographic sensor 39 and control circuit 36.

Steps S63 to S65 are repeated after Step S65. Thus, the direction of the displayed map is continuously adjusted such that the direction from the underground walkway to the ground entrance/exit always is aligned with (matches) the direction of the map displayed in the screen 33 regardless of the direction of the portable terminal device 40.

When the user of the portable terminal device 40 enters the second cell (FIG. 2) to step downstairs to the underground, a map of the underground is displayed in the screen 33. The top of the map always is aligned with the direction from the ground entrance/exit of the underground walkway to the underground regardless of the direction of the portable terminal device 40.

Figure 15:
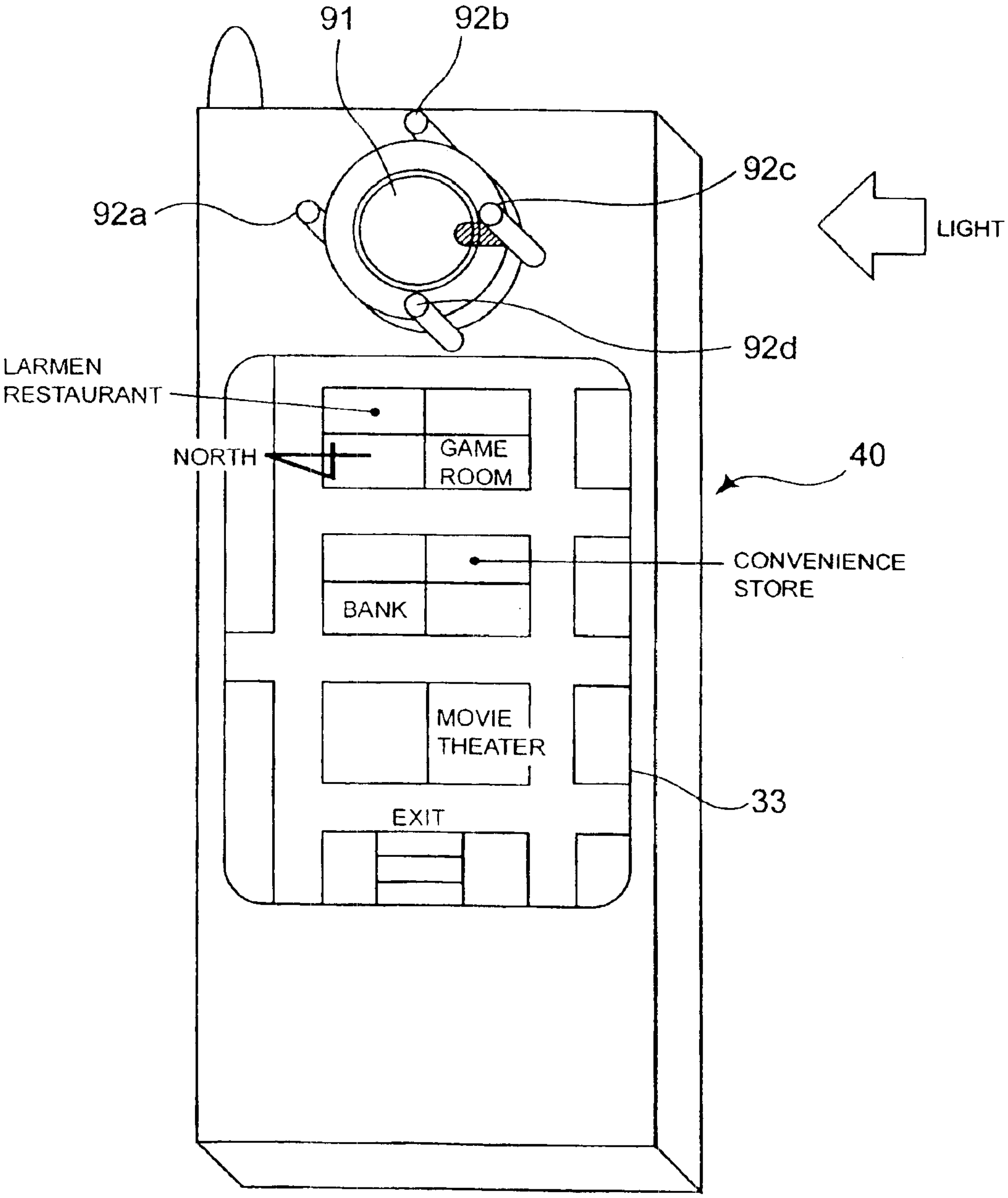
FIG. 15 illustrates an appearance of a modified portable terminal device.

Although the geomagnetic sensor 39 is provided as the direction detection means for the portable terminal device 40 in the above described embodiment, other types of direction detection means may be employed. For instance, a CCD camera 91 and four rods 92*a* to 92*d* may be provided in or on the portable terminal device 40 as illustrated in FIG. 15. The four rods 92*a* to 92*d* are located around a lens of the CCD camera 91 at equal intervals. Shadows of the rods 92*a* to 92*d* made on the portable terminal device 40 by the sunlight, moonlight or particular starlight (e.g., light from the North Star) are detected by the CCD camera 91 when the portable terminal device 40 is held horizontally. The direction of the portable terminal device 40 is then calculated on the basis of relationship between the shadows of the sunlight (or moonlight or particular starlight) and day-and-time. The relationship between the shadows of the sunlight (or moonlight or particular starlight) and day-and-time is stored in the portable terminal device beforehand.

It should be noted that although the wireless communication technique in compliance with the Bluetooth standard is utilized for the communication between the host device and portable terminal device in the above described embodiments, other wireless communication technique such as IrDA (Infrared Data Association), HomeRF (Home Radio Frequency) and IEEE 802.11 may be utilized. The rods 92*a* to 92*d* may be replaced with any projections as long as the projections can make shadows.

As described above, the system of the present invention displays a map such that the moving direction of the portable terminal device is aligned with the top of the displayed map. Therefore, a user of the portable terminal device can easily understand relationship between a moving direction of the user and the top of the map (direction of the map) in the display.

This application is based on Japanese Patent Application No. 2000-352508, and the entire disclosure thereof is incorporated herein by reference.

What is claimed is:

1. A system for displaying a map in a display unit of a mobile terminal device, comprising:

a terminal detector for detecting if the mobile terminal device exists in a first region on a path;

a transmitter for transmitting map data representing a map of and around the first region to the mobile terminal device when the terminal detector detects that the mobile terminal device exists in the first region;

a receiver for receiving the map data from the transmitter; and a controller for causing the display unit to display the map based on the map data received by the receiver such that a top of the map is aligned with a top of the display unit.

2. The system according to claim 1, wherein the transmitter transmits the map data formatted such that the top of the displayed map is aligned with the moving direction of the mobile terminal device.

3. The system according to claim 1, wherein the path includes a route of an elevator in a building, the terminal detector includes a unit for determining the first region in accordance with a floor at which the elevator will stop, and the transmitter transmits to the mobile terminal device map data of the floor at which the elevator will stop.

4. The system according to claim 3, wherein the terminal detector includes a module for determining another region in accordance with another floor at which the elevator will stop next, and the transmitter transmits to the mobile terminal device map data of the another floor at which the elevator will stop next.

5. The system according to claim 1 further including a direction detector for detecting a direction of the mobile terminal device, wherein the controller converts the map data on the basis of the direction of the mobile terminal device detected by the direction detector such that a top of the map displayed in the display unit is always directed in a certain direction regardless of the direction of the mobile terminal device.

6. The system according to claim 5, wherein the direction detector includes a geomagnetic sensor provided operatively coupled to the mobile terminal device.

7. The system according to claim 5, wherein the direction detector includes a plurality of elements on a surface of the mobile terminal device, a camera for photographing shadows made by the plurality of elements and a calculator for calculating the direction of the mobile terminal device on the basis of the photographed shadows.

8. The system according to claim 1, wherein the transmitter and receiver are in compliance with the Bluetooth standard.

9. The system according to claim 1, wherein the terminal detector has a directional antenna for the first region to detect a radio signal issued from the mobile terminal device.

10. A host device for transmitting map data to a mobile terminal device, comprising:

a terminal detector for detecting if the mobile terminal device exists in a first region on a path; and a transmitter for transmitting map data representing a map of and around the first region to the mobile terminal device when the terminal detector detects that the mobile terminal device exists in the first region.

11. The host device according to claim 10, wherein the transmitter transmits the map data such that a top of the displayed map is aligned with a moving direction of the mobile terminal device along the path.

12. The host device according to claim 10, wherein the path includes a route of an elevator in a building, the terminal detector includes a unit for determining the first region in accordance with a floor at which the elevator will stop, and the transmitter transmits to the mobile terminal device map data of the floor at which the elevator will stop.

13. The host device according to claim 12, wherein the terminal detector includes a module for determining another region in accordance with another floor at which the elevator will stop next, and the transmitter transmits to the mobile terminal device map data of the another floor at which the elevator will stop next.

14. The host device according to claim 10, wherein the transmitter is in compliance with the Bluetooth standard.

15. The host device according to claim 10, wherein the terminal detector has a directional antenna for the first region to detect a radio signal issued from the mobile terminal device.

16. A method of displaying a map in a display unit of a mobile terminal device, comprising the steps of:

A) detecting if the mobile terminal device exists in a first region on a path;

B) transmitting map data representing a map of and around the first region to the mobile terminal device when existence of the mobile terminal device in the first region is detected in Step A;

C) receiving the map data; and

D) causing the display unit to display the map based on the map data received at Step C such that a top of the displayed map is aligned with a moving direction of the mobile terminal device along the path.

17. A system for displaying a map in a display unit of a mobile terminal device, comprising:

a first terminal detector for detecting if the mobile terminal device exists in a first region on a path;

a second terminal detector for detecting if the mobile terminal device exists in a second region other than the first region on the path;

a first transmitter for transmitting first map data representing a first map of and around the first region to the mobile terminal device when the first terminal detector detects that the mobile terminal device exists in the first region;

a second transmitter for transmitting second map data representing a second map of and around the second region to the mobile terminal device when the second terminal detector detects that the mobile terminal device exists in the second region;

a receiver for receiving the first map data from the first transmitter and the second map data from the second transmitter; and a controller for causing the display unit to display one of the first and second maps based on one of the first and second map data received by the receiver such that a top of the displayed first or second map is aligned with a moving direction of the mobile terminal device along the path.

18. The system according to claim 17, wherein when the receiver receives the first and second map data at different times within a predetermined period, the controller ignores one of the first and second map data which is received later than the other, and causes the display unit to keep displaying one of the first and second maps based on the map data received earlier.

19. The system according to claim 17, wherein the first map data is formed such that a top of the displayed first map is aligned with a direction from the first region to the second region along the path, and the second map data is formed such that a top of the displayed second map is aligned with a direction from the second region to the first region.

20. The system according to claim 17, wherein the path bends between the first and second regions, wherein when the second terminal detector detects presence of the mobile terminal device in the second region after the first terminal detector detects presence of the mobile terminal device in the first region, the controller converts the first map data on the basis of a degree of bending of the path such that a top of the display unit is aligned with a direction from a bending point of the path to the second region, and wherein when the first terminal detector detects presence of the mobile terminal device in the first region after the second terminal detector detects presence of the mobile terminal device in the second region, the controller converts the second map data on the basis of the degree of bending of the path such that the top of the display unit is aligned with a direction from a bending point of the path to the first region.

21. A host device for transmitting map data to a mobile terminal device, comprising:

a first terminal detector for detecting if the mobile terminal device exists in a first region on a path;

a second terminal detector for detecting if the mobile terminal device exists in a second region other than the first region on the path;

a first transmitter for transmitting first map data representing a first map of and around the first region to the mobile terminal device when the first terminal detector detects that the mobile terminal device exists in the first region; and a second transmitter for transmitting second map data representing a second map of and around the second region to the mobile terminal device when the second terminal detector detects that the mobile terminal device exists in the second region.

22. The host device according to claim 21, wherein the second transmitter does not transmit the second map data to the mobile terminal device when the second terminal detector detects presence of the mobile terminal device in the second region in a predetermined period after the first terminal detector detects presence of the mobile terminal device in the first region.

23. The host device according to claim 21, wherein the first transmitter does not transmit the first map data to the mobile terminal device when the first terminal detector detects presence of the mobile terminal device in the first region in a predetermined period after the second terminal detector detects presence of the mobile terminal device in the second region.

24. The host device according to claim 21, wherein the first and second transmitters are in compliance with the Bluetooth standard.

25. The host device according to claim 21, wherein the first terminal detector has a directional antenna for the first region to detect a radio signal issued from the mobile terminal device in the first region, and the second terminal detector has a directional antenna for the second region to detect a radio signal issued from the mobile terminal device in the second region.

26. A method of displaying a map in a display unit of a mobile terminal device, comprising the steps of:

A) detecting if the mobile terminal device exists in a first region on a path;

B) detecting if the mobile terminal device exists in a second region other than the first region on the path;

C) transmitting first map data representing a map of and around the first region to the mobile terminal device when presence of the mobile terminal device in the first region is detected in Step A;

D) transmitting second map data representing a map of and around the second region to the mobile terminal device when presence of the mobile terminal device in the second region is detected in Step B; and E) receiving at least one of the first and second map data and causing the display unit to display the map based on the received map data such that a top of the displayed map is aligned with a moving direction of the mobile terminal device along the path.

27. A mobile terminal device comprising:

a display unit;

a receiver for receiving map data;

a controller for causing the display unit to display a map based on the map data received by the receiver; and a direction detector for detecting a direction of the mobile terminal device, wherein the controller converts the received map data on the basis of the direction of the mobile terminal device detected by the direction detector such that the displayed map is always directed in a particular direction regardless of the direction of the mobile terminal device.

28. The mobile terminal device according to claim 27, wherein the direction detector includes a geomagnetic sensor.

29. The mobile terminal device according to claim 27, wherein the direction detector includes a plurality of elements on a surface of the mobile terminal device, a camera for photographing shadows made by the plurality of elements and a calculator for calculating the direction of the mobile terminal device on the basis of the photographed shadows.

30. The mobile terminal device according to claim 27, wherein the receiver is in compliance with the Bluetooth standard.

31. A mobile terminal device comprising:

a display unit;

a receiver for receiving map data; and a controller for causing the display unit to display a map based on the map data received by the receiver, wherein when the receiver receives first map data of a first cell within a predetermined period after receiving second map data of a second cell other than the first cell, the controller ignores the first map data and causes the display unit to keep displaying the map based on the second map data.

32. The mobile terminal device according to claim 31, wherein the receiver is in compliance with the Bluetooth standard.

* * * * *